(12) United States Patent
Wang

(10) Patent No.: US 7,826,218 B2
(45) Date of Patent: Nov. 2, 2010

(54) FOLDABLE ELECTRONIC DEVICE

(75) Inventor: Wei-Jun Wang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 145 days.

(21) Appl. No.: 12/254,146

(22) Filed: Oct. 20, 2008

(65) Prior Publication Data

US 2010/0020489 A1 Jan. 28, 2010

(30) Foreign Application Priority Data

Jul. 25, 2008 (CN) .................. 2008 1 0303070

(51) Int. Cl.
*H05K 5/00* (2006.01)
*H05K 7/00* (2006.01)
(52) U.S. Cl. ..................... 361/679.55; 361/679.58

(58) Field of Classification Search ............ 361/679.55, 361/679.58
See application file for complete search history.

(56) References Cited

U.S. PATENT DOCUMENTS 7,050,295 B2* 5/2006 Kang .................... 361/679.58

* cited by examiner

*Primary Examiner*—Jayprakash N Gandhi
*Assistant Examiner*—Anthony M Haughton
(74) *Attorney, Agent, or Firm*—Clifford O. Chi

(57) ABSTRACT

An exemplary foldable electronic device includes a first cover, a second cover rotatably coupled to the first cover, and a latch mechanism. The latch mechanism includes a hooking portion and a latching portion. The hooking portion is positioned on the first cover and the latching portion is positioned on the second cover and arranged corresponding to the hooking portion. The latching portion includes a latch and a resilient member. The resilient member is positioned between the latch and the second cover. The latch is slidable in the second cover. The latch engages with the hooking portion when aligned with the hooking portion, and the latch disengages from the hooking portion when staggered from the hooking portion.

14 Claims, 4 Drawing Sheets

FOLDABLE ELECTRONIC DEVICE

BACKGROUND

1. Field of the Invention

The present disclosure generally relates to foldable electronic devices and, particularly, to a foldable electronic device having a top cover and a main body.

2. Description of the Related Art

Portable electronic devices, such as notebook computers, are popular for their portability. When a notebook computer is not being used, a cover is flipped over a main body for protecting a display on the cover and a keyboard on the main body and locked together by a typical latch mechanism. When the notebook computer is in use, the cover is opened from the main body.

However, the typical latch mechanism often has a sliding member attached to the cover. The cover is opened by sliding the sliding member and separating the cover from the main body. The sliding member generally has a small outer surface area inconspicuously positioned on the edge of the cover. Thus, when sliding the sliding member to open the top cover, the finger may slip. As a result, opening the top cover may be bothersome.

Therefore, a new foldable electronic device is desired in order to overcome the above-described shortcomings.

SUMMARY

An exemplary foldable electronic device includes a first cover, a second cover rotatably coupled to the first cover, and a latch mechanism. The latch mechanism includes a hooking portion and a latching portion. The hooking portion is positioned on the first cover and the latching portion is positioned on the second cover and arranged corresponding to the hooking portion. The latching portion includes a latch and a resilient member. The resilient member is positioned between the latch and the second cover. The latch is slidable in the second cover. The latch engages with the hooking portion when aligned with the hooking portion, and the latch disengages from the hooking portion when staggered from the hooking portion.

Other advantages and novel features will become more apparent from the following detailed description of various embodiments, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present foldable electronic device. Moreover, in the drawings, like reference numerals designate corresponding parts throughout several views, and all the views are schematic.

DETAILED DESCRIPTION OF THE EMBODIMENTS

Reference will now be made to the drawings to describe the present foldable electronic device in detail.

The present foldable electronic devices, may be notebooks, cell phones, media players, and so on. In the exemplary embodiment, a notebook computer is used to describe the foldable electronic device of the present disclosure.

Figure 1:
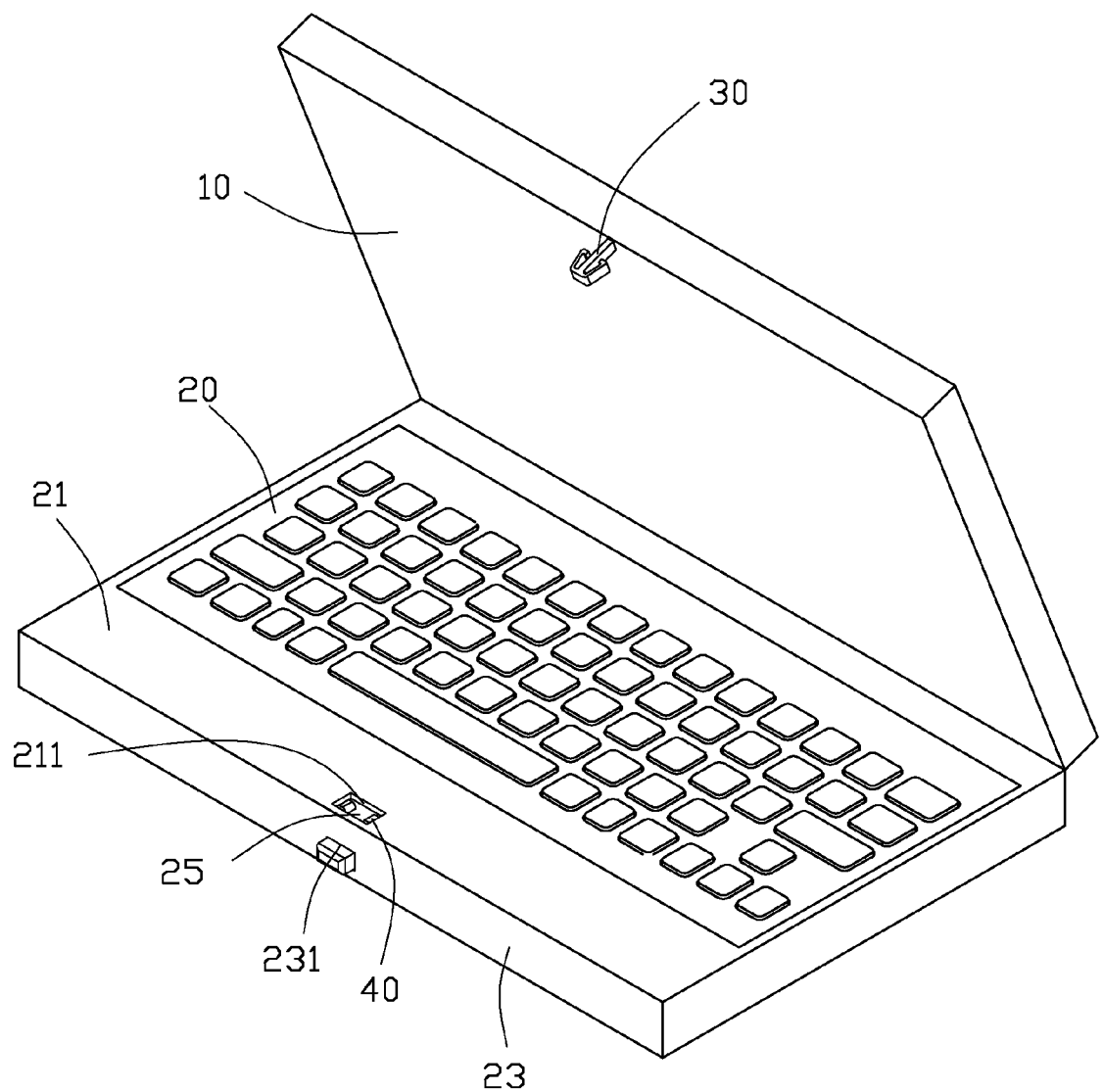
FIG. 1 is an assembled, isometric view of one embodiment of a foldable electronic device, the foldable electronic device including a top cover, a main body, and a latch mechanism.

Referring to FIG. 1, a notebook computer (not labeled) includes a top cover 10, a main body 20, and a latch mechanism (not labeled). The top cover 10 is rotatably mounted to the main body 20. The latch mechanism includes a hooking portion 30 positioned in the top cover 10 and a latching portion 40 formed in the main body 20.

The main body 20 includes a top wall 21, a sidewall 23 extending perpendicularly from the top wall 21, and a receptacle 25. The top wall 21 faces a display of the top cover 10. The receptacle 25 is defined below the top wall 21. The top wall 21 defines an engaging opening 211 communicating with the receptacle 25. The sidewall 23 defines a button slot 231 communicating with the receptacle 25. The main body 20 further includes a fixing plate 251 (see FIG. 3) fixed to the sidewall 23. The fixing plate 251 is spaced from the sidewall 23 and faces the button slot 231.

Figure 2:
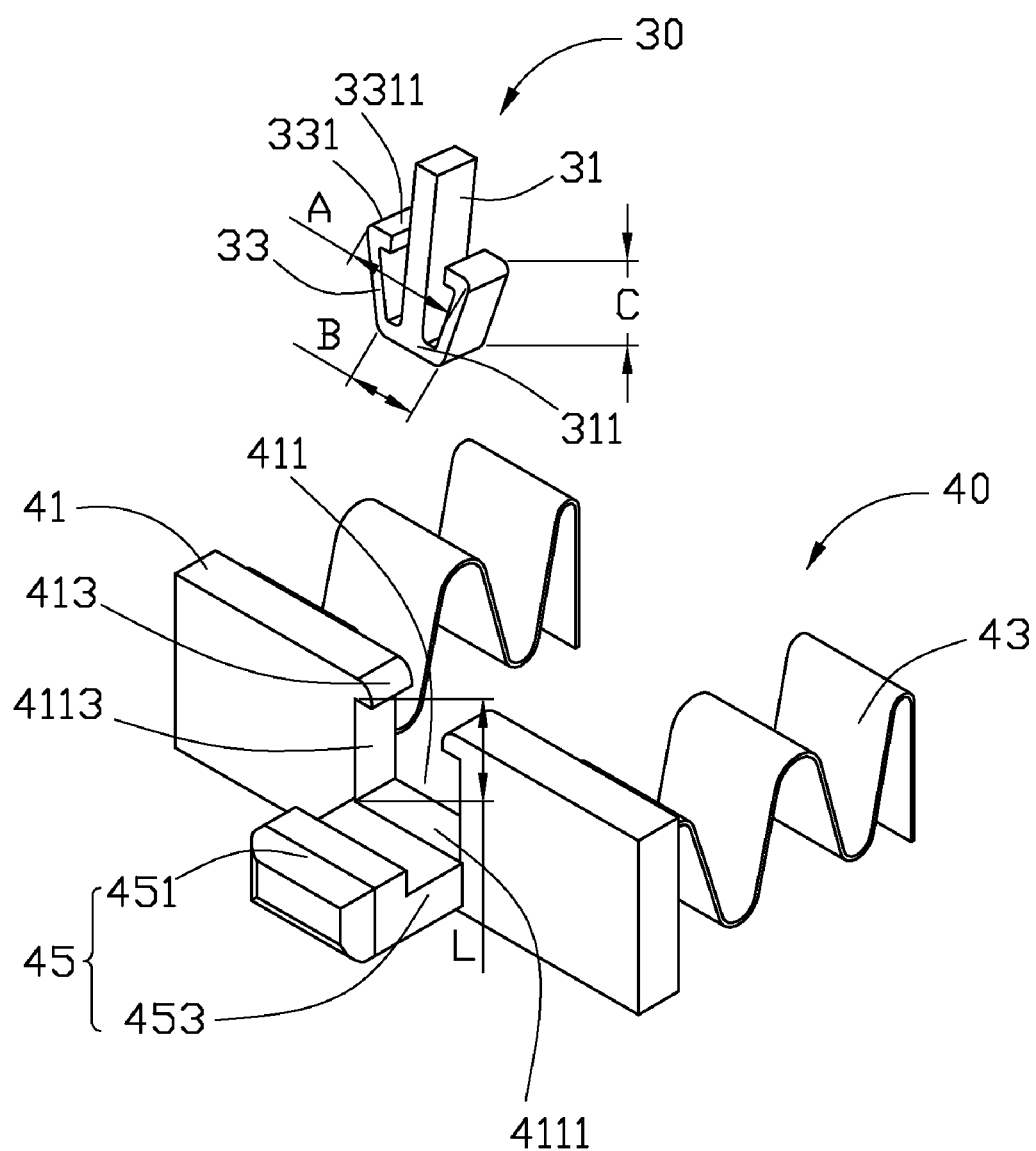
FIG. 2 is a partial exploded, isometric view of the latch mechanism of the foldable electronic device of FIG. 1.

Referring also to FIG. 2, the hooking portion 30 includes a T-shaped bracket 31, and two elastic arms 33. The bracket 31 has a connecting portion 311 at an end of the bracket 31. The two arms 33 bend away from opposite ends of the connecting portion 311 towards the bracket 31 and have two distal ends 331. The distal ends 331 form two protrusions 3311 extending toward the bracket 31. The protrusions 3311 are configured for preventing the arms 33 from deforming too much towards the bracket 31 and breaking. The hooking portion 30 is fixed to the top cover 10 with the connecting portion 311 facing the main body 20.

The latching portion 40 includes a latch 41, two resilient members 43 fixed at opposite ends of the latch 41, and a button 45 inbetween the resilient members 43. The resilient members 43 and the button 45 are fixed at opposite sides of the latch 41. The latch 41 is a plate defining a latching cutout 411 from an edge. The latching cutout 411 is defined by a bottom portion 4111 and two side portions 4113 at opposite ends of the bottom portion 4111. Two latching projections 413 are formed facing each other on top edges of the side portions 4113 of the latching cutout 411. Each latching projection 413 includes an arc-shaped surface opposite to the latching cutout 411. The button 45 is formed adjacent to the bottom portion 4111 and below the latching cutout 411. The button 45 may be substantially cuboid. The button 45 has a pressing portion 451 and a connecting portion 453 connected to the latch 41. The resilient member 43 may be a compression helical spring, a leaf spring, or a rubber rod. In this embodiment, the resilient member 43 is a leaf spring. In this embodiment, a first end of each resilient member 43 is configured to be fixed to the latch 41, and a second end of the resilient member 43 is configured to be fixed to the fixing plate 251 of the main body 20. In another embodiment, each resilient member 43 abuts the latch 41 and the fixing plate 251.

During assembly, the latching portion 40 is received in the receptacle 25 with a part of the button 45 protruding out of the sidewall 23 of the main body 20 via the button slot 231 and the second end of the resilient member 43 fixed to the main body 20. The button 45 is close to, or abutting, the sidewall 23 of the main body 20.

When the arms 33 are in a free (normal) state, a distance A defined between the two outer surfaces of the distal ends 331 of the arms 33 at a largest measure is equal to or is slightly smaller than a distance between the side portions 4113. A smallest distance between the latching projections 413 of the latch 41 is larger than a length B of the connecting portion 311 of the hooking portion 30, but smaller than the distance A when the arms 33 are in the free state. A distance L defined between a bottom surface of the latching projections 413 and the bottom side 4111 is equal to or is larger than a distance C defined between the protrusions 3311 and the connection portion 311 at the largest measure.

Figure 3:
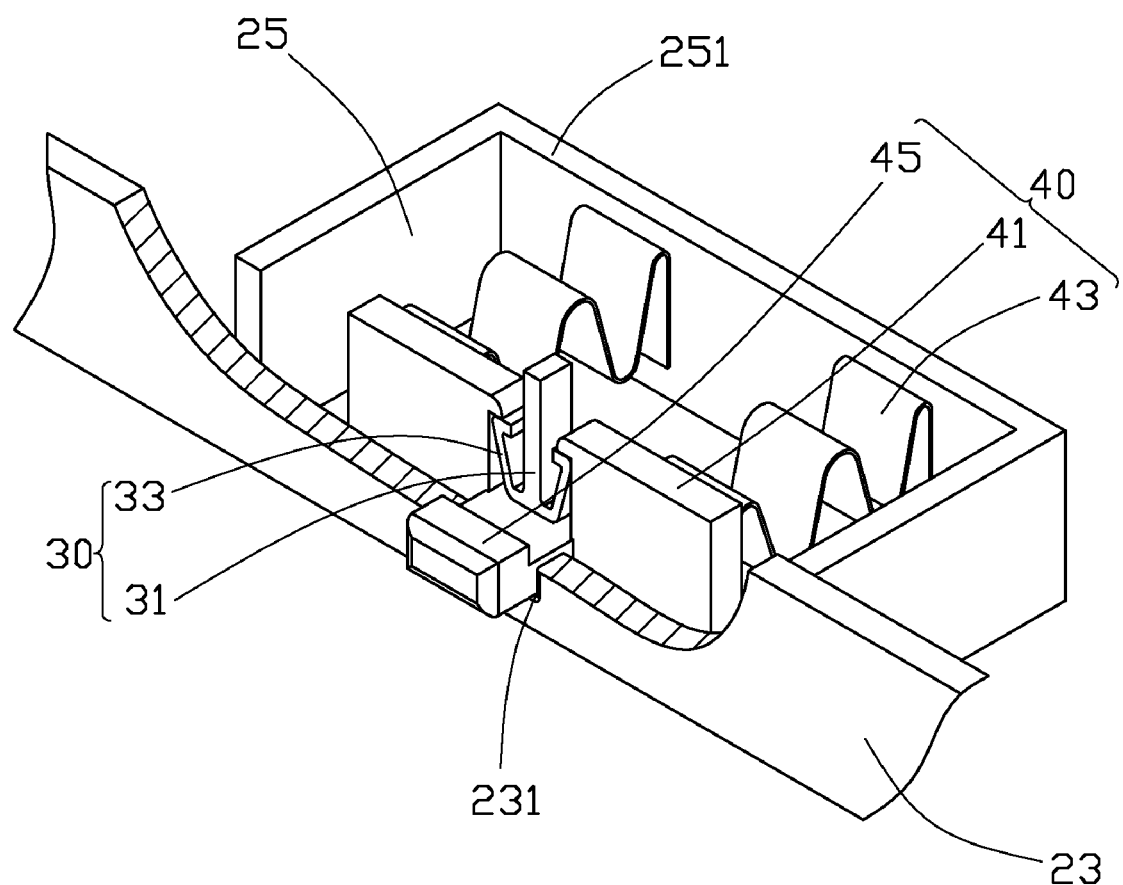
FIG. 3 is an isometric view of the top cover flipped over the main body of the foldable electronic device of FIG. 1.
Figure 4:
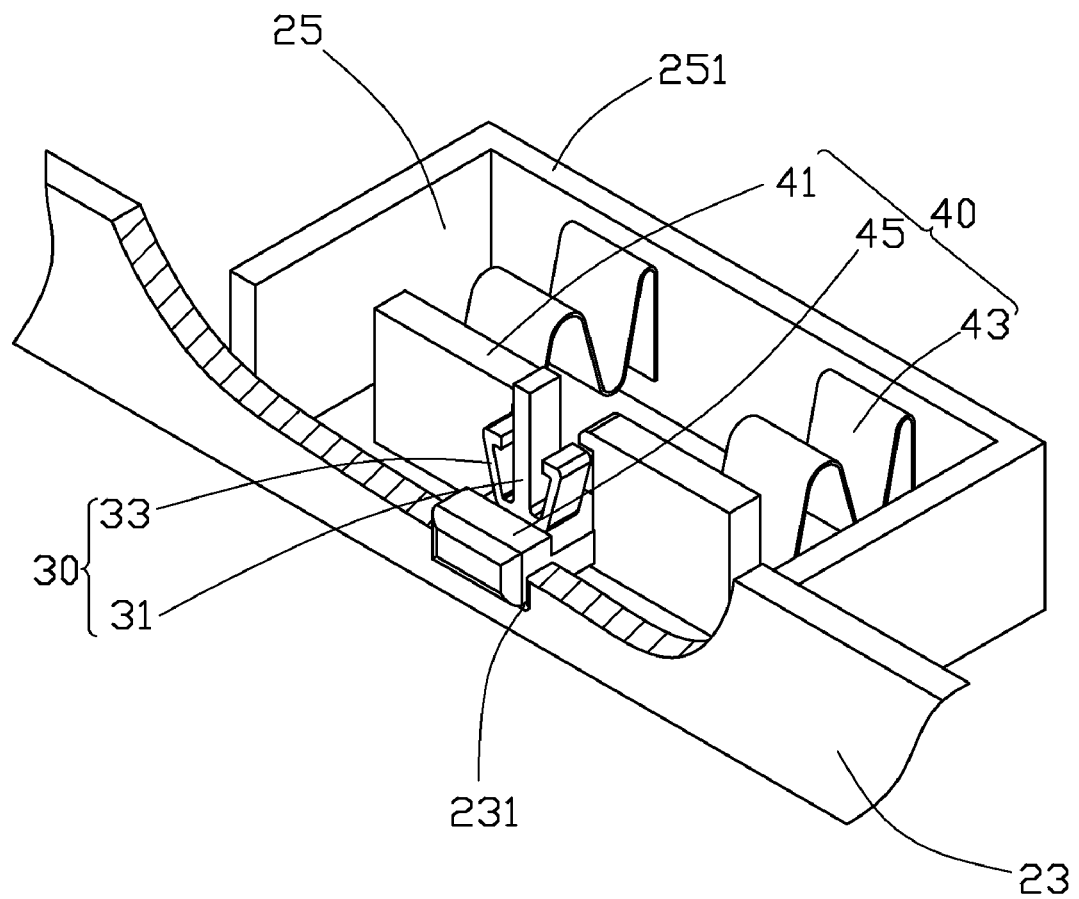
FIG. 4 is similar to FIG. 3, but shown with the top cover separated away from the main body of the foldable electronic device of FIG. 1.

Referring to FIG. 1 through FIG. 3, to fold the notebook computer, an external force is applied to the top cover 10 to push the top cover 10 towards the main body 20, so that the hooking portion 30 gradually moves into the engaging opening 211 and the receptacle 25. The engaging opening 211 urges the arms 33 to move towards each other. Once the distal ends 331 of the arms 33 pass the engaging opening 211, the arms 33 return (spread out) to the normal state. As a result, the arms 33 of the hooking portion 30 become locked in the receptacle 25 and the protrusions 3311 of the hooking portion 30 are engaged with the latching projections 413. Thus, the top cover 10 is latched to the main body 20 because the smallest distance between the latching projections 413 of the latch 41 is smaller than the distance A when the arms 33 are in the normal state. In this state, the latch 41 of the latching portion 40 and the hooking portion 30 lie in a same plane.

To open the top cover 10, another external force is applied to the button 45 to compress the resilient members 43. As a result, the latch 41 is driven to move in the receptacle 25 away from the sidewall 23 of the main body 20 from a first position to a second position. The latch 41 of the latching portion 40 is moved away from the hooking portion 30 until the arms 33 are unlatched from the latching projections 413 of the latching portion 40, thereby unlatching the top cover 10 from the main body 20. When the external force is removed, an elastic force of the resilient members 43 forces the latch 41 and the button 45 to return to the first position.

In the embodiment, the top cover 10 is flipped opened by pushing the button 45. Therefore, slippage between a finger and the button seldom happens, and the top cover 10 can be easily flipped open.

In alternative embodiments, the latch 41, the resilient members 43, and the button 45 may be integrally formed or separately formed. The latching portion may include a single resilient member 43 and a single arm 33. The hooking portion 30 may be positioned on the main body 20 and the latching portion 30 may be positioned on the top cover 10.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A foldable electronic device, comprising:
a first cover;
a second cover rotatably coupled to the first cover; and
a latch mechanism comprising a hooking portion positioned on the first cover and a latching portion positioned on the second cover and arranged corresponding to the hooking portion, the latching portion comprising a latch and a resilient member positioned between the latch and the second cover;
wherein the latch is slidable in the second cover, the latch engages with the hooking portion when aligned with the hooking portion, the latch disengages from the hooking portion when staggered from the hooking portion; the hooking portion comprises a bracket and at least one deformable arm formed at one end of the bracket; the latch of the latching portion forms at least one latching projection for engaging with the at least one deformable arm of the hooking portion; the at least one deformable arm comprises two arms; the bracket comprises a connecting portion at an end of the bracket, the arms bend away from opposite ends of the connecting portion towards the bracket and have two distal ends; the distal ends of the arms form two protrusions extending toward the bracket, the protrusions are configured for preventing the arms from bending too much towards the bracket and breaking; the hooking portion is fixed to the first cover with the connecting portion facing the second cover.

2. The foldable electronic device of claim 1, wherein the latch mechanism further comprises a button fixed to the latch.

3. The foldable electronic device of claim 2, wherein the resilient member and the button are fixed at opposite sides of the latch, a first end of the resilient member is fixed to the latch and a second end of the resilient member is fixed to a fixing plate of the second cover.

4. The foldable electronic device of claim 3, wherein the second cover comprises a top wall facing a display of the first cover, a sidewall adjoining the top wall, and a receptacle defined below the top wall; the top wall defines an engaging opening communicating with the receptacle; the sidewall defines a button slot communicating with the receptacle; the latch and the resilient member of the latching portion are received in the receptacle; the button protrudes out the second cover via the button slot; the hooking portion protrudes into the receptacle via the engaging opening.

5. The foldable electronic device of claim 4, wherein the fixing plate is fixed to and spaced from the sidewall, and faces the button slot.

6. The foldable electronic device of claim 1, wherein the at least one latching projection comprises two latching projections; the latch defines a latching cutout from an edge, the latching cutout is defined by a bottom portion and two side portions at opposite ends of the bottom side; the latching projections are formed on top edges of the sides of the latching cutout.

7. The foldable electronic device of claim 6, wherein when the arms are in a free state, a distance between the two outer surfaces at its largest measure of the distal ends of the arms is equal to or slightly smaller than a distance between the sides; a smallest distance between the latching projections of the latch is larger than a length of the connecting portion of the hooking portion, but smaller than the distance between the two outer surfaces at its largest measure of the distal ends of the arms when the arms are in the free state; a distance between a bottom surface of the latching projections and the bottom side is equal to or larger than a distance between the protrusions and the connection portion at its largest measure.

8. The foldable electronic device of claim 6, wherein each latching projection comprises an arc-shaped surface opposite to the latching cutout.

9. A foldable electronic device, comprising:
a first cover;
a second cover rotatably coupled to the first cover; and
a latch mechanism comprising a hooking portion positioned on the first cover and a latching portion positioned on the second cover and arranged corresponding to the hooking portion, the latching portion comprising a latch and a resilient member positioned between the latch and the second cover;

wherein the latch is slidable in the second cover along a first direction; when the first cover is folded onto the second cover, the hooking portion moves to engage with the latching portion in a second direction substantially perpendicular to the first direction; when the first cover is opened from the second cover, the latch is forced to move along the first direction to disengage from the hooking portion; the hooking portion comprises a bracket and at least one deformable arm formed at one end of the bracket; the latch of the latching portion forms at least one latching projection for engaging with the at least one deformable arm of the hooking portion; the at least one deformable arm comprises two arms; the bracket comprises a connecting portion at an end of the bracket, the arms bend away from opposite ends of the connecting portion towards the bracket and have two distal ends; the distal ends of the arms form two protrusions extending toward the bracket, the protrusions are configured for preventing the arms from bending too much towards the bracket and breaking; the hooking portion is fixed to the first cover with the connecting portion facing the second cover.

10. The foldable electronic device of claim 9, wherein the latch mechanism further comprises a button fixed to the latch.

11. The foldable electronic device of claim 10, wherein the second cover comprises a top wall facing a display of the first cover, a sidewall adjoining the top wall, and a receptacle defined below the top wall; the top wall defines an engaging opening communicating with the receptacle; the sidewall defines a button slot communicating with the receptacle; the latch and the resilient member of the latching portion are received in the receptacle; the button protrudes out the second cover via the button slot; the hooking portion protrudes into the receptacle via the engaging opening.

12. The foldable electronic device of claim 9, wherein the at least one latching projection comprises two latching projections; the latch defines a latching cutout from an edge, the latching cutout is defined by a bottom portion and two side portions at opposite ends of the bottom side; the latching projections are formed on top edges of the sides of the latching cutout.

13. The foldable electronic device of claim 12, wherein when the arms are in a free state, a distance between the two outer surfaces at its largest measure of the distal ends of the arms is equal to or slightly smaller than a distance between the sides; a smallest distance between the latching projections of the latch is larger than a length of the connecting portion of the hooking portion, but smaller than the distance between the two outer surfaces at its largest measure of the distal ends of the arms when the arms are in the free state; a distance between a bottom surface of the latching projections and the bottom side is equal to or larger than a distance between the protrusions and the connection portion at its largest measure.

14. The foldable electronic device of claim 12, wherein each latching projection has an arc-shaped surface opposite to the latching cutout.

* * * * *